UNITED STATES PATENT OFFICE.

FRIEDRICH FISCHER, OF BARMEN, ASSIGNOR TO FARBENFABRIKEN, VORMALS FRIEDR. BAYER & CO., OF ELBERFELD, GERMANY.

VIOLET METHYL DYE-STUFF.

SPECIFICATION forming part of Letters Patent No. 325,828, dated September 8, 1885.

Application filed April 25, 1885. (Specimens.)

*To all whom it may concern:*

Be it known that I, FRIEDRICH FISCHER, of the city of Barmen, in the Empire of Germany, have invented a new and useful Improvement in Coloring-Matters, of which the following is a full, true, and accurate description.

My invention relates to the production of a new violet dye-stuff. The violet dye-stuff is formed by the action upon dimethyl-aniline of perchlormethylmercaptan, which is the product of the reaction of chlorine upon carbon disulphide.

In carrying out my process practically I proceed as follows: Eleven parts perchlormethylmercaptan are allowed to run slowly into a mixture of twenty-five parts dimethyl-aniline and eight parts calcium carbonate contained in a kettle provided with a stirrer and standing in a water bath, the mixture being constantly stirred and cooled externally. The green pulpy mixture which forms is constantly stirred and gradually elevated to between 80° and 90° centigrade in the course of twenty-four hours by heating the water bath during the time indicated. The reaction will be demonstrated by the molten character assumed by the original green pulpy mixture. At the end of the period above named the whole mass presents a melt of coppery luster, which is brittle when cold, and contains the already-formed violet dye-stuff, which may be extracted by water. Purification and isolation of the dye-stuff may be effected in various ways. The whole melt is best dissolved in a small quantity of acidulated water filtered from resinous products decomposed by means of caustic-soda solution to liberate the bases, and the dimethyl-aniline which has not entered into the reaction is then expelled by means of steam. The resulting base is converted into either hydrochloric, sulphuric, or oxalic acid salt by known methods. The new violet that results is of excellent purity and brilliancy.

The new violet color, which is obtained in the form of crystals, is distinguishable by producing on the tissue a splendid fiery violet, which is much finer, bluer, and purer than the color produced by the usual methyl violet. Its muriate forms beautiful bronze-like crystallized needles, thus proving that a uniform chemical combination has taken place. In this way it may be distinguished from the known methyl violet, which does not crystallize. If the violet is treated with reducing agents—as, for instance, with zinc dust and muriatic acid—then the salt of a colorless organic base is produced, which in its free state cystallizes out of alcohol in colorless needles or small plates or flakes. By treating a salt of this base with oxidizing substances we can obtain once more the original crystallizable violet dye-stuff. If a solution of the violet dye-stuff is mixed in water with a strong acid, at first green solution is obtained, which turns yellow by adding more acid. A reverse sequence of this change of color is obtained by adding alkali to the acid solution of the dye-stuff.

I do not in this application claim the process described, intending to make a separate application therefor.

What I claim as my invention, and desire to secure by Letters Patent, is—

The product herein described, having the properties specified.

FRIEDRICH FISCHER.

Witnesses:
   GEO. H. EVANS,
   ANTHONY GREF.